United States Patent

Dragoset, Jr. et al.

Patent Number: 5,729,506
Date of Patent: Mar. 17, 1998

[54] 3-D MULTIPLE ATTENUATION

[75] Inventors: William Henry Dragoset, Jr.; Louis Joseph Ward, both of Houston, Tex.

[73] Assignee: Western Atlas International, Inc., Houston, Tex.

[21] Appl. No.: 751,640

[22] Filed: Nov. 18, 1996

[51] Int. Cl.$^6$ ............................. G01V 1/36; G01V 1/38
[52] U.S. Cl. ..................................... 367/24; 367/21
[58] Field of Search ................................ 367/21, 24, 53

[56] References Cited

U.S. PATENT DOCUMENTS

| | | | |
|---|---|---|---|
| 4,907,205 | 3/1990 | Yanchak | 367/24 |
| 5,448,531 | 9/1995 | Dragoset, Jr. | 367/45 |
| 5,587,965 | 12/1996 | Dragoset, Jr. et al. | 367/24 |

*Primary Examiner*—Ian J. Lobo
*Attorney, Agent, or Firm*—William A. Knox

[57] ABSTRACT

A computationally economical method for applying multi-dimensional multiple-reflection attenuation to a marine seismic-signal data set comprised of a plurality of common shot gathers that have surface-multiple wavefields embedded therein. The multi-dimensional data are assumed to have been gathered from a plurality of parallel 2-D lines of survey. From every nth reference line, where n is a small number greater than 2, a common shot gather is selected. For every so-selected common shot gather, a reference surface-multiple wavefield is predicted as a function of offset and travel time with the aid of any well-known multiple attenuation routine, using a wavelet having fixed attributes in terms of amplitude, phase and frequency. A common shot gather is chosen from among the plurality of common shot gathers. The predicted surface-multiple wavefield nearest to the chosen common shot gather is adaptively filtered to match the predicted surface-multiple wavefield to the surface-multiple wavefield embedded in the chosen common shot gather. The matched predicted surface multiple wavefield is subtracted from the embedded surface multiple wavefield to provide a multiple-free common shot gather.

5 Claims, 6 Drawing Sheets

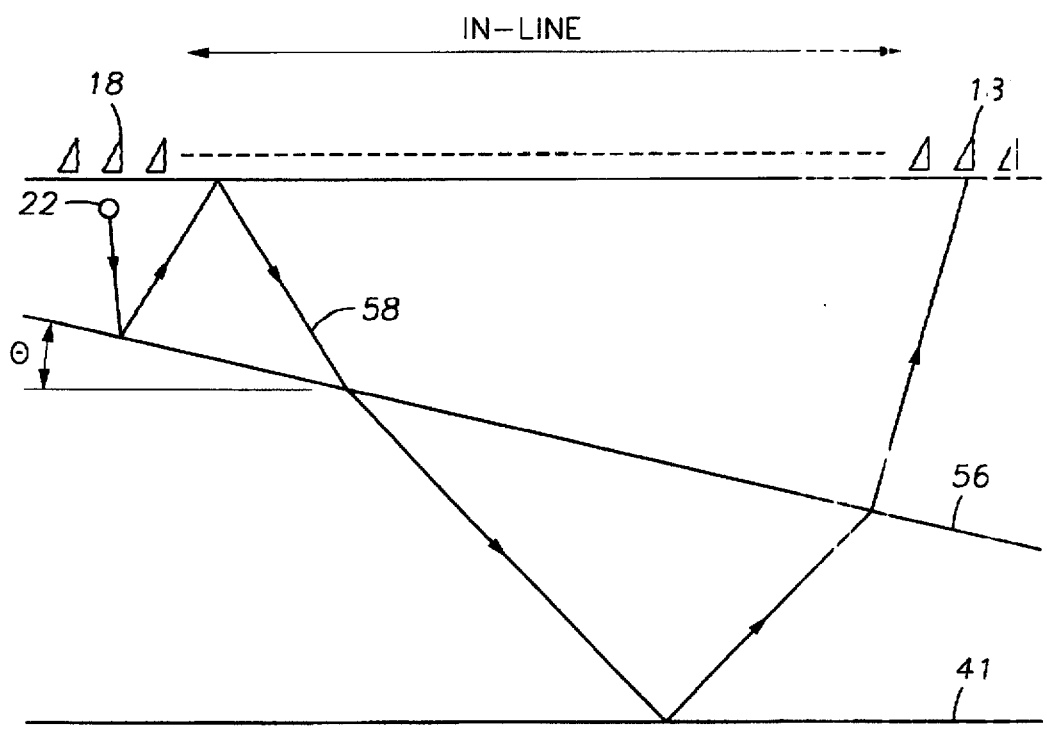
FIG. 5
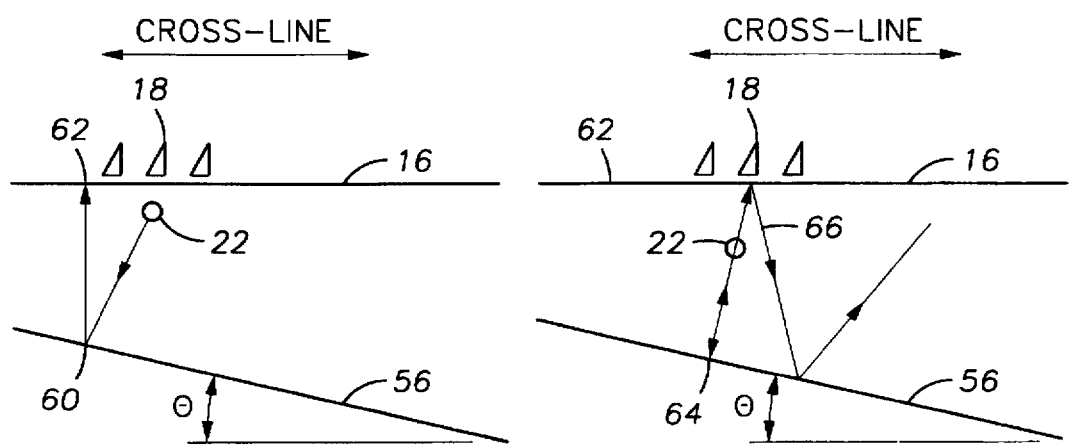
FIG. 6  FIG. 7

3-D MULTIPLE ATTENUATION

BACKGROUND OF THE INVENTION

1. Field of the Invention

This invention relates to marine seismic surveying and in particular to the attenuation of surface multiples from 3-D seismic data sets in the presence of cross-line dip of the water bottom.

2. Discussion of Relevant Art

As is well known, during the conduct of a marine seismic survey, a ship 10, FIG. 1, tows a long streamer cable 12 through a body of water 14 at or near the surface 16 thereof. The streamer 12 includes a plurality of spaced-apart seismic receivers shown by the rectangles 18, 18', 18", 18'", such as hydrophones distributed at selected spatial intervals such as 5–15 meters, along the cable which may be several kilometers long. The receivers are coupled by suitable transmission means of any desired type (not shown) mounted in the cable, to a recording device 20 on the ship 10. In some operations, the receivers are laid directly on the water bottom.

As the ship proceeds along a designated line of survey, a sound source 22 of any desired variety, also towed by the ship 10, repeatedly radiates a source wavefield (fires a shot) at desired time intervals. The wavefield propagates by spherical spreading to insonify subsurface earth layers whence the wavefield is reflected back up towards the water surface. There, the receivers sense the mechanical pressure variations (or earth motions in the case of bottom cables) due to the returning reflected seismic wavefield, convert the mechanical motions to a desired signal format and transmit the signals to the recording device over the transmission means. For each shot, the recording device formats the received reflected signals as a two-dimensional (2-D) multi-trace time-scale recording as a function of two-way wavefield traveltime and receiver in-line offset from the source position, as a common shot gather.

As the ship progresses along the line of survey, many hundreds or thousands of common shot gathers may accumulate. Generally, in a seismic survey, an entire area is studied, not just a single, in-line, 2-D line of profile as indicated in FIG. 1. A three-dimensional (3-D) survey in terms of travel time and receiver offset both in-line and cross-line may be obtained from a sequence of substantially parallel, spaced-apart 2-D lines such as 24–34, FIG. 2, which provide the cross-line data. The circles represent source locations and the upright triangles 18–18$^i$ represent receivers, 18. This disclosure applies primarily to 3-D marine seismic surveys using a plurality of parallel 2-D lines, although it may be applied to 3-D land surveys wherein the operation is conducted using a similar sequence of 2-D lines as above-described. 4-D seismic surveys have also been reported in the literature.

The plurality of common shot gathers that accumulate during the course of a 3-D survey, form a marine seismic-signal data set composed of a plurality of in-line common shot gathers. Since the respective lines were shot independently, there can be no cross-line common shot gathers. The in-line receiver spacing along the streamer cable may be on the order of 5 to 25 meters by way of example as before stated. The cross-line spacing between lines is usually an integral multiple of the in-line receiver spacing.

The acoustic energy of a seismic wavefield may be reflected from any elastic discontinuity. Rock-layer boundaries, the interface between a body of water and the water bottom, the air-water interface (at sea) or the air-earth interface (on land), all define examples of elastic discontinuities. The change in acoustic impedance at a discontinuity is, inter alia, a function of the acoustic propagation velocities and the densities of the two media at the discontinuity, of which velocity is the parameter most commonly measured. The reflection coefficient depends upon the change in acoustic impedance. The polarity of a reflected wavelet is a function of the relative velocities on opposite sides of the discontinuity.

FIG. 3 shows a source 22 and several receivers 18 extending along the in-line direction from source 22. When source 22 radiates a wavefield, the wavefield ideally propagates directly from source 22 to subsurface stratum 41 whence it is reflected back to receiver 18' as a primary reflection. Many other ray paths such as 42, 44, 46 to other receivers such as 18", 18'", 18$^1$ of course exist. The respective travel time measurements, after correction for angularity and terrain effects, provide a profile of the topography of subsurface stratum 41. Reflections from the water bottom 49 are also recorded.

As earlier stated, the reflection coefficients of the air/water interface and the water/sea-floor interface is quite high, approaching unity in some cases. Those interfaces constitute excellent reflecting surfaces that generate undesired multiple reflections as indicated in FIG. 4. A wavefield radiated from source 22 not only propagates along primary ray path 40, it may be reflected along multiple ray paths from sea floor 49 at incident point 50, to 18', thence to subsurface stratum 41 at incident point 52, whence it bounces back up to the water surface at 18", hopping once more between sea floor 49 and receiver 18'". Multiple reflections such as the above create a complex signal pattern that must be removed from the in-line common shot gathers for proper interpretation of the data set.

The ray paths shown are intended to define surface multiples, that is, multiples which have their downward reflections of the water surface. Interbed multiples and ghost reflections are excluded from this teaching.

The example of FIG. 4 assumes substantially zero dip. FIG. 5 illustrates to complexities introduced in the presence of an in-line dip angle of Θ of, for example, the sea floor 56. A one- or two-hop multiple emerges a considerable distance down-dip from the source as shown by ray path 58. The multiple can be recognized and removed provided the in-line spread of receivers is of suitable length such that the multiple and its primary is actually recorded and the dip is not excessive (Θ<≈25°).

A number of methods are known in the industry for removing multiple reflections from a seismic data set. One such preferred method is disclosed in allowed U.S. Pat. No. 5,587,965, filed Apr. 26, 1996 in the name of W. H. Dragoset and Z. Jericevic, assigned to the assignee of this invention, the patent being incorporated herein by reference.

In the '965 patent application, a marine seismic signal is transformed from the time domain into the frequency domain and represented by a matrix D. The marine data signal is truncated in time, transformed into the frequency domain and represented by the matrix $D_T$. Eigenvalue decomposition $D_T = S \cdot A \cdot S^{-1}$ of matrix $D_T$ is computed. Matrix product D·S is computed and saved in memory. Matrix inverse $S^{-1}$ is computed and saved in memory. An initial estimate of the source wavelet w is made. Source wavelet w is computed by iterating the steps of computing diagonal matrix $[I-w^{-1}A]$, computing matrix inverse $[I-w^{-1}A]^{-1}$, retrieving matrix product D·S and matrix inverse $S^{-1}$, and minimizing the total energy in matrix product [D·S][I−w$^{-1}$A]$^{-1}$ S$^{-1}$. Primary matrix P representing the wavefield free of surface multiples is computed by inserting computed value for w into the expression [D·S] [I−w$^{-1}$A]$^{-1}$ S$^{-1}$. Primary matrix P is inverse transformed from the frequency domain into the time domain.

The method above outlined is satisfactory for use in regions where the line of profile is aligned substantially in the direction of maximum dip and provided both primary reflections and multiple reflections are present and are recorded. In the case where the lines of profile are shot parallel to strike, such as shown in FIG. 2 by dip/strike symbol 55, a problem exists because certain data are not recorded.

Refer to FIGS. 6 and 7 showing significant cross-line dip of the water bottom 56. In these two Figures, the streamer-cable longitudinal axis is aligned perpendicular to the page. In accordance with conventional practice and in the absence of cable-feathering due to ocean currents, the seismic receivers 18 are substantially aligned along a center line through the source 22. In FIG. 6, the ray path 22-60-62-60-22 illustrates a first-order multiple whose surface reflection is off to the side of the line of seismic receivers 18. The two primary events that make up this multiple are never seen by the receivers and hence are not recorded. In FIG. 7, ray path 22-64-18 is a primary that is recorded but the associated multiple 66 is reflected out of the plane of the line of receivers and is not recorded. Because of the missing reflection data, existing processing methods can not adequately attenuate multiple reflections along a seismic line shot parallel to strike.

An additional problem that besets existing methods is the need to iteratively search for and construct a source wavelet for each common shot gather. That process is very greedy of expensive computer time and may become decidedly uneconomical.

There is a need for an economical method for attenuating surface multiple reflections from 3-D data in the presence of significant cross-line dip.

SUMMARY OF THE INVENTION

This invention provides a method for attenuating surface-multiple wavefields resident in a multi-dimensional marine seismic-signal data set that was derived from seismic wave-field signals as recorded on each of a plurality of spaced-apart common shot gathers distributed in a cross-line configuration substantially parallel to strike. For every nth common shot gather, counted in the cross-line direction, n being a small number greater than 2, a predicted surface-multiple wavefield is defined as a function of time and offset. A source wavelet having preselected fixed attributes of amplitude, phase and frequency is constructed. A common shot gather is selected from among the plurality of parallel common shot gathers. The nearest predicted surface-multiple wavefield is adaptively filtered to match the predicted surface-multiple wavefield to the surface-multiple wavefield resident in said selected common shot gather. The so-matched predicted surface-multiple wavefield is subtracted from the resident surface-multiple wavefield.

In accordance with an aspect of this invention, in-line and cross-line multiple attenuation is provided by iterating the above process for every common shot gather included in the plurality of common shot gathers that contributed to the marine seismic signal data set.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 5 is a showing the distorted multiple ray paths associated with an in-line dipping water bottom;

FIGS. 6 and 7 are showings of primary and multiple data-loss in the presence of cross-line dip;

DETAILED DESCRIPTION OF THE PREFERRED EMBODIMENT

Figure 1:
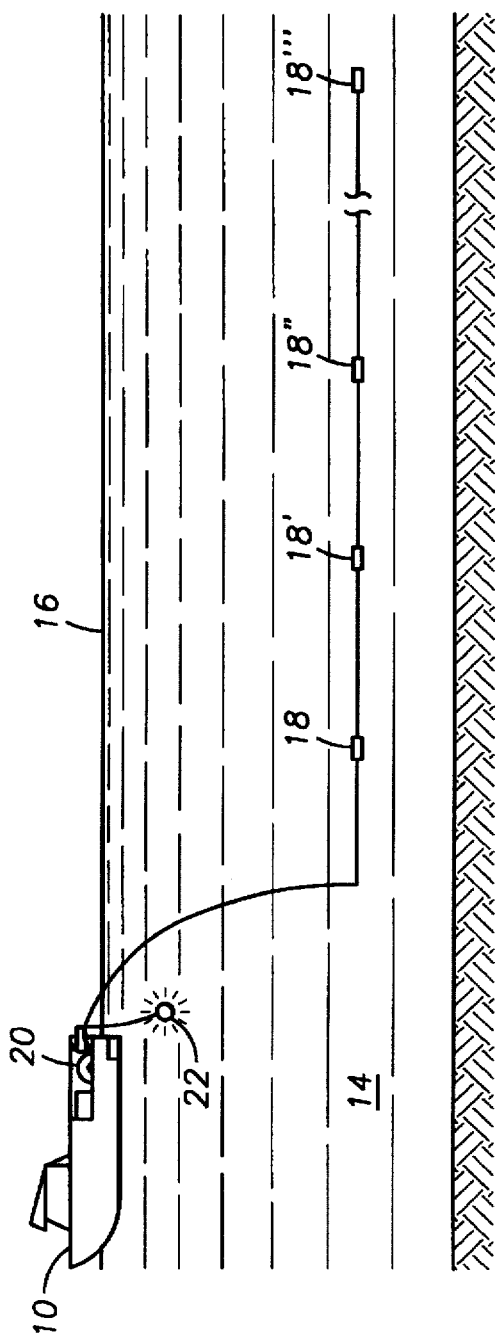
FIG. 1 shows a ship towing an acoustic source and a seismic cable containing receivers, through a body of water.
Figure 2:
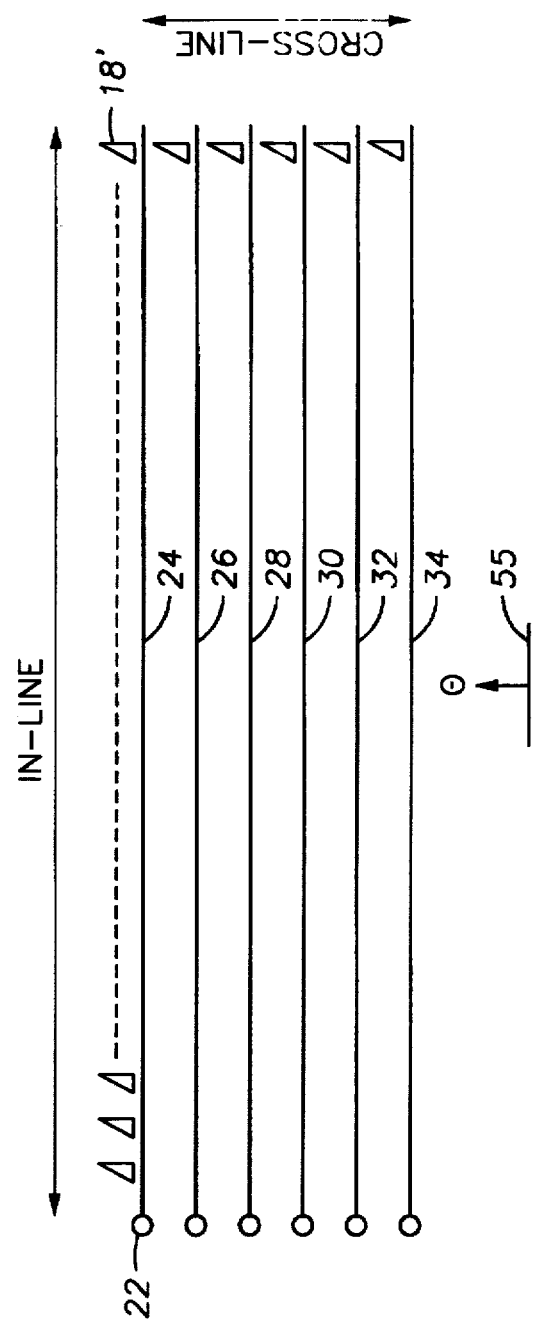
FIG. 2 illustrates a sequence of seismic lines aligned parallel to strike.
Figure 4:
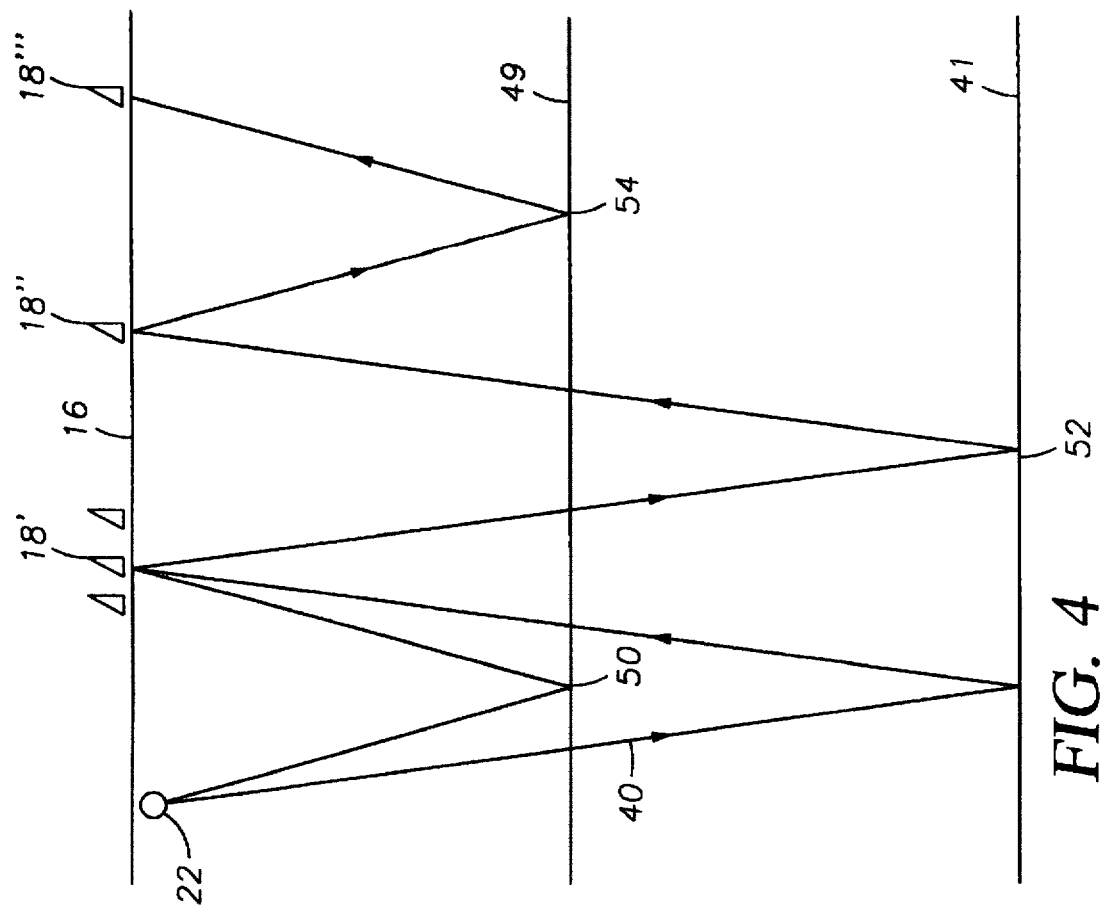
FIG. 4 is a diagram showing ray paths for multiple reflections in the presence of a substantially horizontal water bottom.
Figure 3:
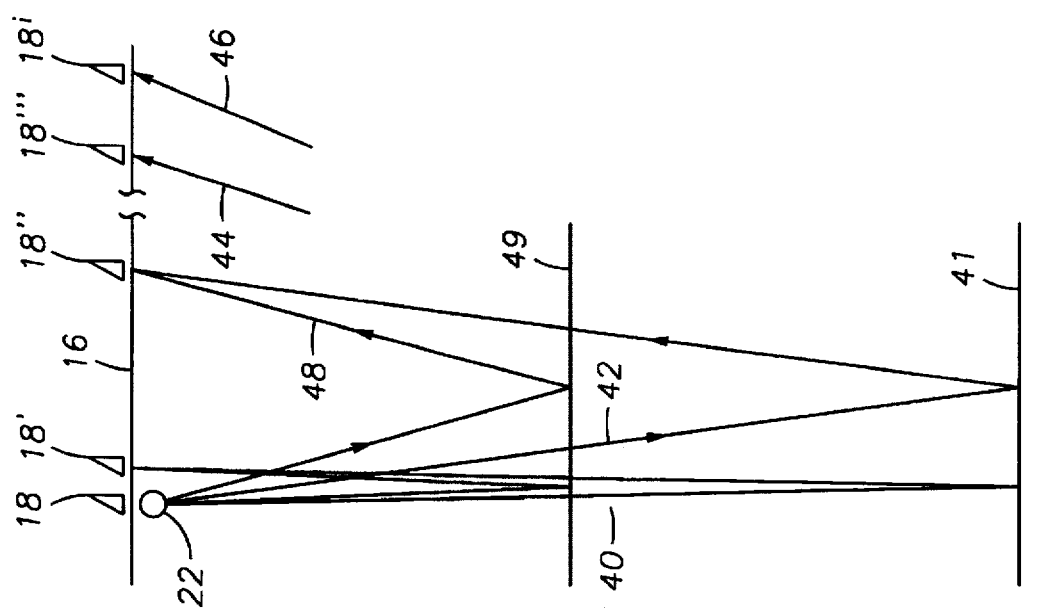
FIG. 3 is a diagram showing ray paths for primary reflections.
Figure 8:
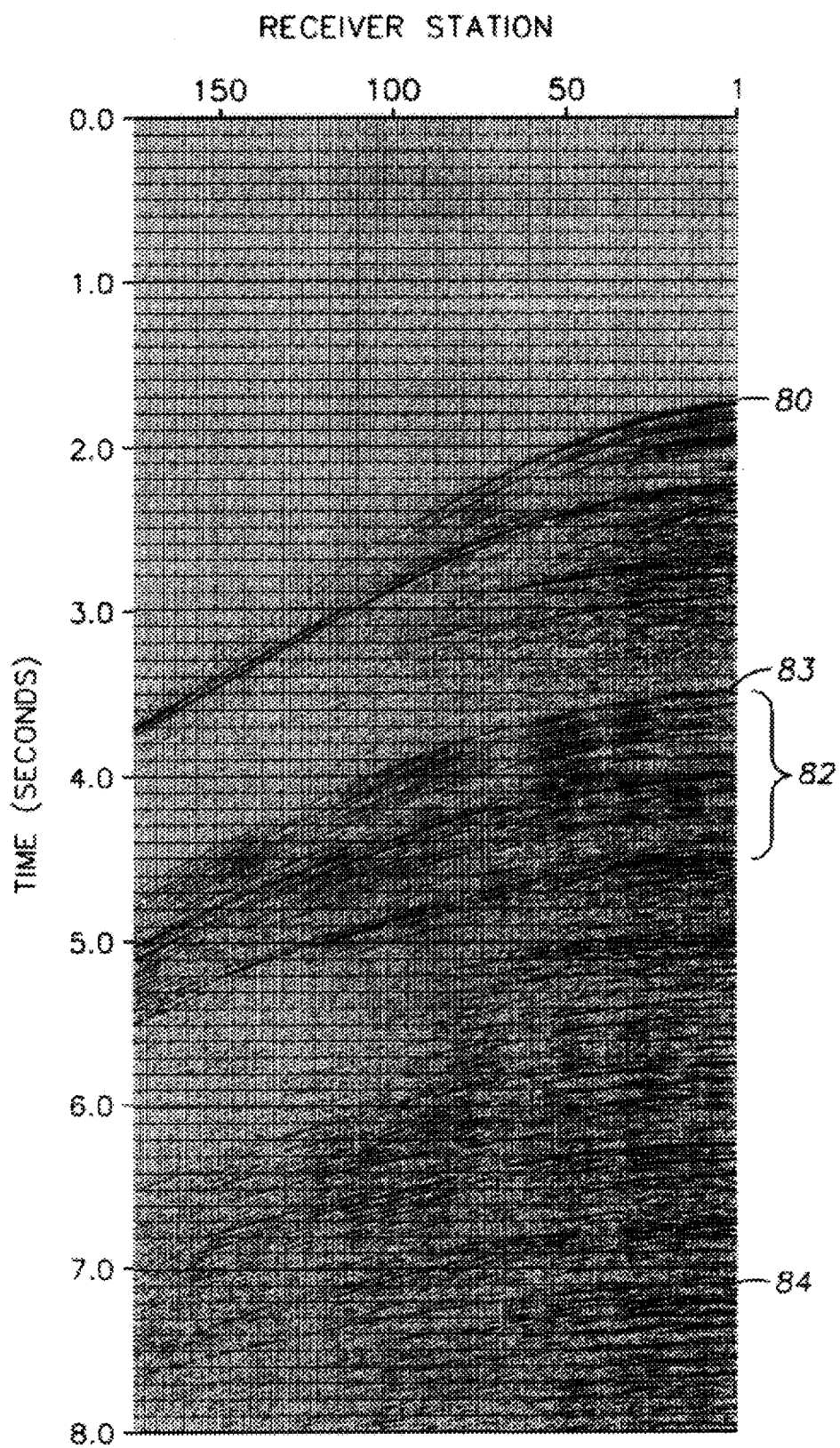
FIG. 8 is a common shot gather contaminated with multiple reflections.

FIG. 8 is an exemplary common shot gather such as might have been selected from among the plurality of common shot gathers harvested from one of the lines shown in FIG. 2. The seismic signals recorded from the plurality of common shot gathers from within the same survey area collectively comprise a marine seismic data set. In FIG. 8, the receiver-station numbers of the receivers that contribute to the common shot gather of this example are indicated along the top horizontal axis. The vertical axis is two-way reflection travel time in seconds.

In this example, the water-bottom reflection, 80, appears at about 1.75 seconds. Several prominent primary reflections are distributed beneath the water bottom to a depth of about 3.0 seconds. The entire reflection sequence, repeats to form a surface-multiple wavefield (embraced by brace 82) that is resident in the common shot gather of FIG. 8, starting at about 3.5 seconds (twice the water depth). Observe the phase reversal of the multiple water-bottom reflection 83 relative to the primary reflection 80. Many high-order multiples appear to be present, starting at about 4.5 seconds. A deep-seated primary reflection, 84 appears at about 7.1 seconds.

Previously-known multiple attenuation methods as applied to 2-D profiling required calculation of a predicted multiple wavefield for every gather and every line after performing a source-wavelet search. The source-wavelet search required a lengthy iterative routine to minimize the total energy in a matrix product as earlier explained. That process is computationally very expensive.

In this invention, we modify certain steps of the process of the '965 patent. First, rather than conducting a tedious source-wavelet search for every common shot gather, we use an arbitrary source wavelet that has fixed attributes of amplitude, phase and frequency. Secondly, it is often true that the multiple wavefield changes slowly cross-line. Therefore, it is reasonable to assume a single predicted surface multiple wavefield can be used for processing a number of common shot gathers in the immediate vicinity. Those modifications result in a significant saving in computer processing costs.

A predicted multiple wavefield is computed for every nth line, defined as a reference line, where n is a small number greater than 2. The definition of a "small number" depends on the cross-line rate of change of water-bottom dip and the dip of other bedding planes and on the line spacing. Assuming moderate uniform dip less than about 20° and a reference-line spacing of about 25 meters, n preferably might be about 24 or less.

Using the teachings of the '1965 patent, a predicted surface-multiple wavefield is defined for every reference line of the plurality of parallel lines of survey, as a function of travel time and receiver in-line offset using a fixed-attribute source wavelet.

A common shot gather is selected from among the plurality of common shot gathers that make up the data set. The predicted surface-multiple wavefield that was computed from the reference line that lies nearest to the selected common shot gather is adaptively filtered to match the predicted surface-multiple wavefield to the surface multiple wavefield found to be resident in the selected common shot gather.

Preferably, the line-spacing multiple n should be an odd number so that there can be no dispute as to which of two reference lines is "nearest", as would be the case with an even-numbered line spacing. Thus, assuming that line 24, FIG. 2 is reference line 0 and n=5, line 34 would be the next reference line. Reference line 24 provides the predicted surface multiple wavefield for use in processing common shot gathers from any one of lines 24, 26 or 28.

A preferred adaptive filtering process is taught by U.S. Pat. No. 5,448,531, issued Sep. 5, 1995 to William. H. Dragoset and assigned to the assignee of this application, which patent is incorporated herein by reference. The '531 patent adaptively creates a filter for removing environmental noise from a multi-trace digital seismic recording such as a common shot gather. The method requires the presence on the recording of a limited sample of pure noise which, in this context may be a surface multiple reflection, which is uncontaminated by the desired signal. The pure noise sample is used to discover the location of the noise source, which in this process is the water surface, and from that discovery, to extrapolate and reconstruct or match the characteristics of the noise envelope as it would appear on the seismic recording. The matched noise envelope is used as a noise reference for input to a conventional iterative adaptive noise cancellation filter loop. For stability, the loop gain is minimized by temporally and spatially averaging the filter coefficients for each sample interval.

Following the adaptive filtration process, the matched predicted surface-multiple wavefield is subtracted from the selected common shot gather to produce a recording that is minimally contaminated by surface-multiples. The above process is repeated for every common shot gather in every line that contributes to the seismic-signal data set.

Figure 9:
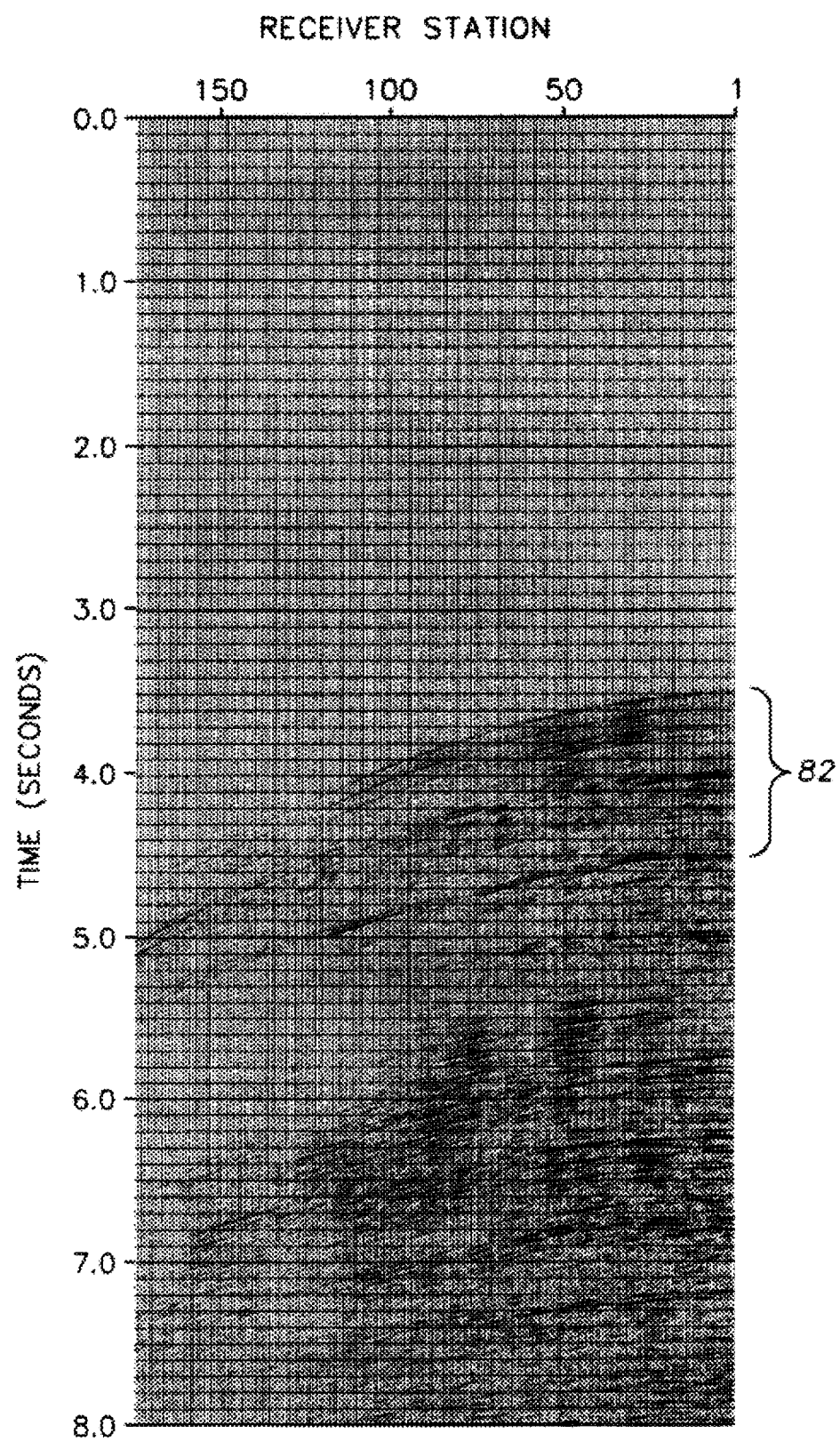
FIG. 9 is an example of a predicted surface-multiple wavefield.

FIG. 9 is an example of a predicted surface-multiple wavefield prepared using a preselected source wavelet according to the method of this invention. The multiple wavefield at 3.5 seconds as well as the deeper high-order multiples are clearly defined. Observe, however, that the primary water-bottom reflection 80, the other primary reflections above 3.5 seconds and the deep primary at 7.1 seconds do not appear on the predicted surface-multiple wavefield recording of FIG. 9 as is proper.

Figure 10:
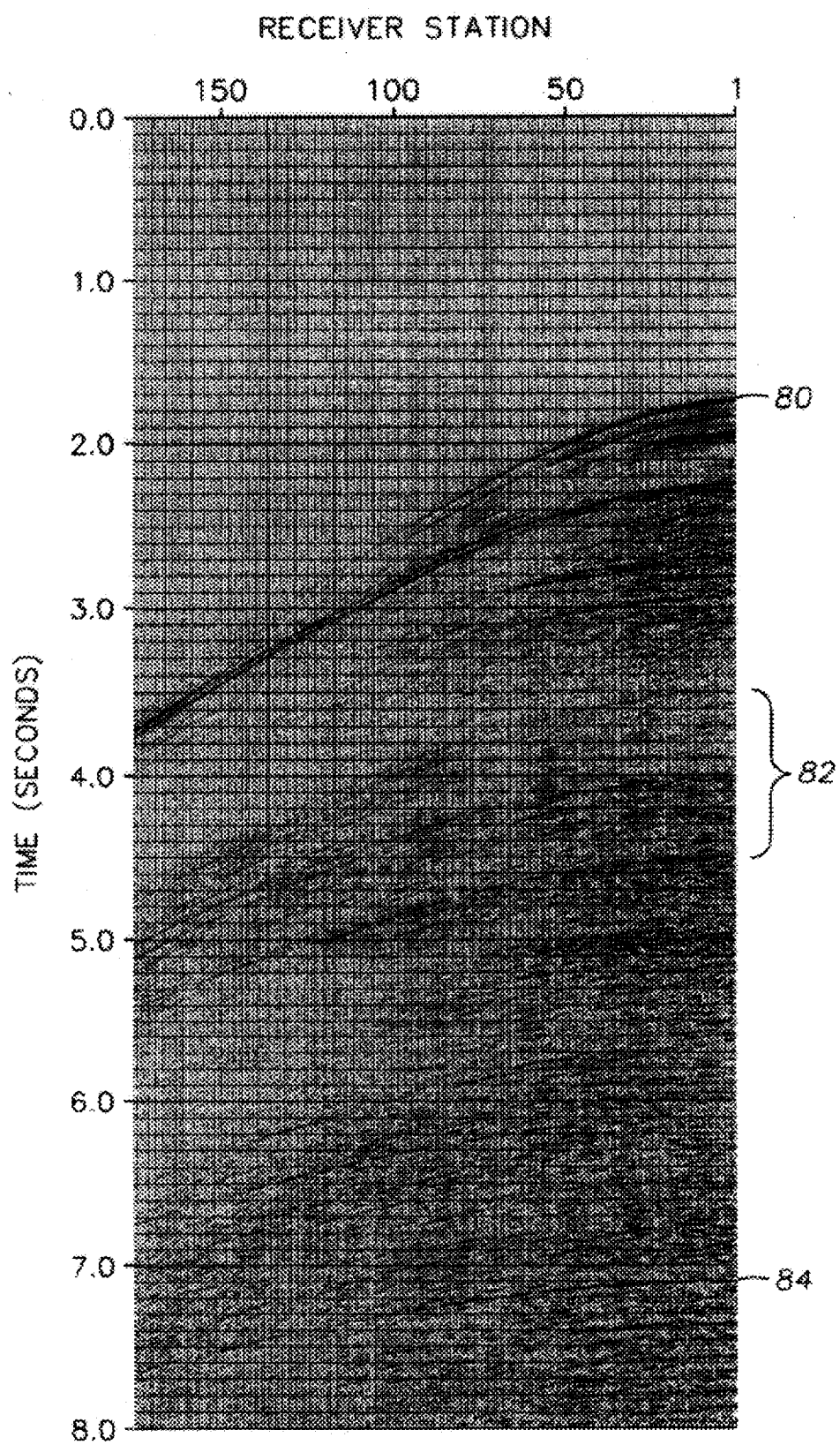
FIG. 10 shows the result of adaptively filtering and subtracting the predicted surface-multiple wavefield from the multiple-contaminated common shot gather of FIG. 8.

FIG. 10 is the example of FIG. 8 after multiple attenuation by adaptively filtering and subtracting the predicted surface-multiple wavefield of FIG. 9 from the multiple wavefield resident on the common shot gather of FIG. 8. The primary reflections at 80 and 84 are not affected but the multiple wavefield has been considerably attenuated by use of the method of this invention.

Both in-line and cross-line multiple attenuation is provided by repeating the process for every common shot gather included within the data set, using the predicted surface multiple wavefield as defined for the respective reference lines nearest to each of the common shot gathers in the data set.

The process as above recited may be applied either before or after stack. If applied after stack, the predicted surface-multiple records for every nth reference line are stacked in-line. The predicted surface-multiple wavefield is then removed from the surface-multiple wavefield resident on a selected stacked line using the filtration and subtraction process in the manner described.

This invention has been described with a certain degree of specificity by way of example but not by way of limitation. Those skilled in the art will devise variations to the examples given herein but which will fall within the scope and spirit of this invention which is limited only by the appended claims.

What is claimed is:

1. A method for attenuating surface multiple wavefields resident in a multi-dimensional marine seismic-signal data set derived from seismic wavefield signals as recorded on each of a plurality of spaced-apart substantially parallel common shot gathers distributed in a cross-line configuration, comprising:

a) for every nth common shot gather, counted in the cross-line direction, n being a small number greater than 2, defining a predicted surface-multiple wavefield as a function of time and offset due to a source wavelet having preselected fixed attributes of amplitude, phase and frequency;

b) selecting an initial common shot gather from among said plurality of parallel common shot gathers;

c) adaptively filtering the predicted surface-multiple wavefield nearest said selected common shot gather, thereby to match said predicted surface-multiple wavefield to the surface-multiple wavefield resident in said selected common shot gather;

d) subtracting the so-matched predicted surface-multiple wavefield from said resident surface-multiple wavefield.

2. The method as defined by claim 1, comprising:

providing in-line and cross-line multiple attenuation in said multi-dimensional seismic-signal data set by repeating steps b) through d) for every common shot gather included in the plurality of common shot gathers contributing to said marine seismic signal data set.

3. The method as defined by claim 1, comprising:

repeating steps b) through d) before stack for every common shot gather included in the plurality of common shot gathers contributing to said marine seismic data set.

4. A method for attenuating surface multiple wavefields resident in a multi-dimensional marine seismic-signal data set derived from seismic wavefield signals as recorded on each of a plurality of spaced-apart substantially parallel common shot gathers distributed in a cross-line configuration, comprising:

a) for every nth seismic line, counted in the cross-line direction, n being a small number greater than 2, defining a stacked predicted surface-multiple wavefield as a function of time and offset due to a source wavelet having preselected fixed attributes of amplitude, phase and frequency;

b) stacking, in-line, the plurality of common shot-gathers;

c) selecting a stacked line from among said plurality of parallel stacked lines;

d) adaptively filtering the stacked predicted surface-multiple wavefield nearest to said selected stacked line, thereby to match said stacked predicted surface-multiple wavefield on a trace-by-trace basis to the surface-multiple wavefield resident in said selected stacked line;

e) subtracting the so-matched stacked predicted surface-multiple wavefield from said resident surface-multiple wavefield.

5. The method as defined by claim 4, comprising:

providing in-line and cross-line multiple attenuation in said multi-dimensional seismic-signal data set by repeating steps c) through e) for every stacked line included in the plurality of stacked lines contributing to said marine seismic signal data set.

* * * * *